Patented Dec. 30, 1941

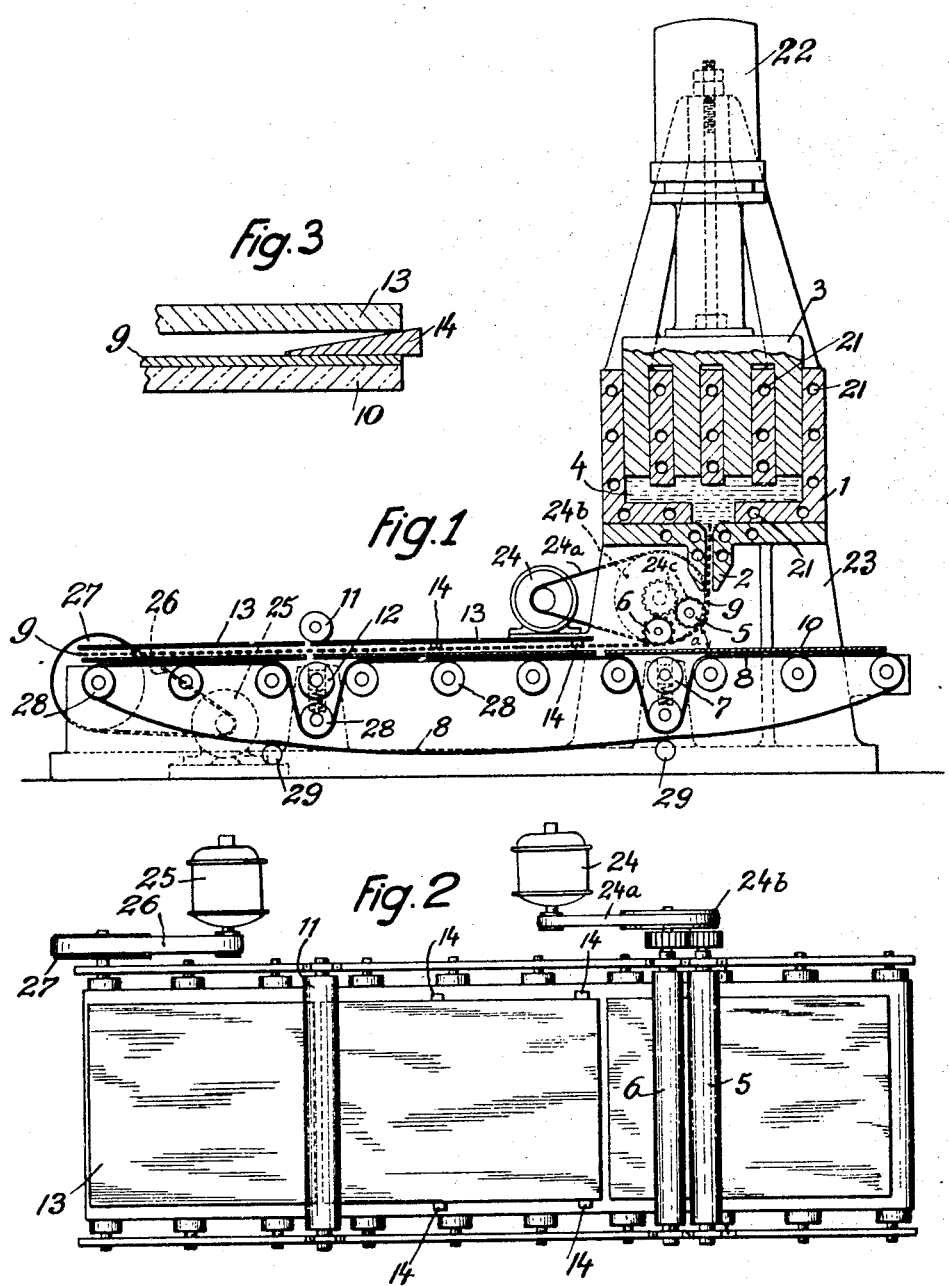

2,268,489

UNITED STATES PATENT OFFICE 2,268,489

METHOD OF UNITING LAMINAE TO FORM LAMINATED GLASS

Adolf Kämpfer, Berlin, Germany

Application December 12, 1938, Serial No. 245,300
In Germany December 11, 1937

5 Claims. (Cl. 49—81)

(Granted under the provisions of sec. 14, act of March 2, 1927; 357 O. G. 5)

This invention relates to a method of building up laminated glass and like laminated products, in which there are disposed between two or more sheets of glass or other suitable material intermediate layers of a plastic which is highly elastic but non-plastic at ordinary temperatures but which are rendered capable of being plasticised merely temporarily under the action of extreme heat.

Greatly elastic intermediate layers of this character impart an unlimited durability to the laminated product and render the same well adapted to withstand vibration and the effects of transport, and are accordingly superior to the intermediate layers hitherto employed, which at the same time also act as an adhesive and in this capacity all possess the property of being mouldable. In this connection there are primarily concerned intermediate layers having a high degree of elasticity at ordinary temperatures which consist of high molecular weight polymerisation products of vinyl acetate, acrylic acid, mixtures thereof or like suitable synthetic substances, which are free from solvents, i. e., are neither polymerised in the presence of or prepared or rendered capable of flowing by means of such solvents nor include traces of the starting materials thereof, and in consequence also as finished products cannot be rendered unsaleable or ineffective or caused to exhibit premature signs of age by reason of traces of solvent which may later assume a gaseous condition. It has been found that these substances, particularly if they have been polymerised in the presence of a few per cent of plasticising agent and a very small percentage of solvents of high boiling point and have been produced in the form of blocks, which are incapable of being chipped or rasped, pulverised or comminuted, but are tough and greatly elastic, and which are not intended for treatment with solvents or other means of a like nature adapted to bring about a state of solution or dispersion for the purpose of producing a condition of flow and to permit of their application for the purpose of forming the intermediate layers, can again be made capable of being moulded or deformed if they are heated, subject to certain precautionary measures, to a comparatively high temperature, which heating requires to be performed in continuously increasing fashion and is so regulated that it has no effect on the physical properties of the substance. Such substances and the method of preparing the same are set forth in my co-pending application, Ser. No. 76,044.

For example, so far as these substances are not heated continuously beyond 135° C. for the purpose of producing their temporary plasticity they are unable to undergo variations of any kind either in the matter of colour or otherwise, and above all they are incapable of additional polymerisation or depolymerisation, whilst on the other hand it is possible upon continuous heating in suitable apparatus to make them capable of being moulded and thus induce them, for example under pressure, to assume the form of foils, sheets or the like.

Owing to their great elasticity they exhibit the tendency to expand when passing out of the moulding apparatus, this tendency being all the more pronounced the greater the drop in temperature when leaving the apparatus, in consequence of which the application to or between the cover sheets or layers of the laminated product so as to be free from bubbles following on the forming of the sheets or foils has been rendered extremely difficult up to now.

It is the object of the invention to overcome the drawbacks aforesaid, and in the accomplishment of this object the invention accordingly comprises a method of building up laminated glass and like laminated products in which layers of a greatly elastic plastic are disposed between two or more sheets of glass or other suitable material, which consists in producing the layers in the form of sheets or foils by extrusion under pressure through a nozzle, rolling the said layer under the action of the said force at an acute angle on to the sheet of glass or the like, which may be located, for example, on a moving belt, and finally applying the second sheet of glass or the like at an acute angle and subjecting the said second sheet to a rolling action.

Owing to the fact that the laminated product is built up by applying the sheets and layers to one another at an acute angle and subjecting them to a rolling action the air within the space enclosed by the acute angle is forced out in the direction opposite to the direction of movement, whereby the possibility is obtained of superimposing the sheets and layers without the inclusion of bubbles, and thus of precluding imprisoned air in any amount whatsoever.

The rollers employed for guiding the greatly elastic intermediate layer and for rolling the laminations together are produced from a yielding material, such as rubber. It has been found that the polished effect imparted upon the forming of the greatly elastic intermediate layers to the surfaces thereof by the smooth-walled slot under the action of the heat is fully maintained, which is an important condition for unimpaired visibility through the laminated glass and for the application of the intermediate layer to the covering sheets without the imprisonment of air. Whereas the application at an acute angle to the first rigid covering sheet of the elastic intermediate layer does not present any difficulties in itself and calls merely for a suitable adjustment of the rollers by which the intermediate layer is fed, the application of the second rigid covering sheet at an acute angle requires special means to enable this angle to be maintained over the entire length of the joint and thus to ensure the expulsion of the air. This can be effected by means of yielding supporting or suspension members acting on the top covering sheet, the resistance of which members is overcome in resilient fashion by the pressure of the rollers. In a convenient embodiment these supporting members consist of wedges of different height which are composed of the same material as the intermediate layer, possess the same degree of elasticity as the latter, and owing to their wedge-shaped form are enabled under the pressure of the rollers to vary their position to such extent that they offer no further resistance to the joining up of the layers, their extreme elasticity preventing a fracture of the covering sheets.

If desired there can be employed in place of the supporting members upon the application of the second sheet to the previously connected intermediate layer and lower sheet a lubricating liquid, which is applied to the belt by moistening the applied foil by means of spraying devices, this liquid assisting the expulsion of the air upon the rolling action on the second sheet in such a way that the liquid forced out by the action of the rollers in the opposite direction carries with it even the smallest particles of air.

The invention will now be described more fully with reference to the accompanying drawing, which illustrates an embodiment of an apparatus for carrying the invention into effect.

Fig. 1 is a cross-section through a moulding press for the intermediate layers and a conveying means for the covering sheets.

Fig. 2 is a plan view of Fig. 1.

Fig. 3 shows on enlarged scale a supporting member for the top covering sheet in its position between the covering sheet and the elastic intermediate layer.

In Fig. 1 the press chamber 1, which is furnished with heating elements 21 in the walls and the bottom and possesses the nozzle 2, which is also furnished with heating elements, co-operates in such fashion with a plunger 3 that the substance located in the press chamber, for example the polymerisation product of a suitably produced vinyl acetate, which has been evenly heated to approximately 120° C., is formed by the slot of the nozzle 2, under the action of a uniform pressure, into layers or foils.

The plunger 3 operates in a cylinder 22 mounted in a frame 23. A moulding press of this kind is described and claimed in my Patent No. 2,154,333 of April 11, 1939, and does not form part of the present invention.

The layer 9 thus formed, after leaving the nozzle, is passed about a roller 5, the surface of which is within range of the extension of the outlet slot of the nozzle, and between a pair of rollers 6 and 7, which are pressed towards each other in resilient fashion, and of which the lower roller 7 acts on the sheets of glass 10, which are conducted below the nozzle 2 on a belt 8, whilst the upper roller 6 at the same time presses the layer 9, in progressive fashion against the appertaining sheet of glass 10, viz., at an acute angle $a$. Within this acute angle $a$ the air is expelled in the direction opposite to the direction of movement of the sheet of glass 10, and the imprisonment of bubbles or pockets of air between the layer 9 and the sheet 10 is thus prevented.

In front of the two rollers 6 and 7, spaced at a distance from these which is greater than the size of the sheet of glass employed, there are two further rollers 11 and 12, which are pressed towards each other in resilient fashion, and of which the lower one 12, in similar fashion to the roller 7, acts on the lower sheet of glass 10, whilst the upper roller 11 acts on the top sheet of glass 13, which in the space between the upper rollers 6 and 11 is applied either by hand or automatically to the intermediate layer 9 already applied to the lower sheet 10. In order to be able to roll on the top sheet 13 whilst providing for an acute angle between the same and the intermediate layer 9 it is necessary to maintain the top sheet 13 in the desired spatial disposal, for example by means of intermediately disposed wedge-shaped members 14. These supporting members 14 are preferably composed of the same synthetic material or plastic as the substance 4 from which the layer 9 is produced. Their provision and their effect will be apparent from Fig. 3.

In place of these wedge-shaped members it is also possible to provide other means which hold the upper sheet of glass 13 in the requisite angular position for such time until the sheet 13 has been moved into a position parallel to the lower sheet 10 under the action of the upper roller 11.

Since the intermediate layer 9 yields in resilient fashion it is quite possible to roll together between the resiliently acting rollers 11 and 12 the three parts 10, 9 and 13 making up the laminated product, in such a way that the top sheet 13 up to its rear edge always remains at an acute angle, if only a small one, in relation to the free surface of the intermediate layer 9. As the three parts 10, 9 and 13 are rolled together the wedges 14 are gradually displaced, in which connection no harm is involved if the final wedges should become wedged between the laminations and unite with the layer 9.

The guide and tension-imparting rollers 5 and 6 preferably consist of a yielding material, such as vulcanized rubber. It has been found that in this case the polished effect possessed by the highly elastic material leaving the slot of the nozzle 2 is maintained.

The guide and tension-imparting rollers 5 and 6 are preferably driven by a motor 24, or any other suitable power source, by way of a belt 24a, pulley 24b and gear wheels 24c. The conveying belt 8 is preferably driven by a motor 25, or any other suitable power source, by way of a belt 26 and a pulley 27. The belt 8 is conducted over guide rollers 28 and is supported on rollers 29.

The substances employed primarily for the intermediate layer in the method and the apparatus according to the invention have no adhesive properties. They merely develop a certain power of adhesion in a greatly heated condition.

For the joining of the laminations there are employed extremely thin applications of adhesive of the kind known per se. In employing the method and the apparatus according to the invention, however, the negative property of the substance can be utilised for obtaining the layers or foils enclosed between two covering sheets in the form of foils or layers having a highly polished finish and suitable for consignment solely as such. For this purpose there are employed in place of the sheets of glass highly polished sheets of metal, and these having the elastic intermediate layer between them are then subjected for a short period to the action of extreme cold, whereupon the sheets of metal are readily detachable from the intermediate layers and the latter, enclosed in protective layers, can be consigned to other countries, to be united later with sheets of glass or the like to form the final laminated product. These foils or layers are distinguished not only by their completely planoparallel faces and uniform thickness, but also by an extremely high polished effect acquired by heat and by their smoothness.

The great economical advantage of the invention resides more particularly in the fact that these foils or layers can be produced on an endless belt in any desired thickness and in a length amounting to many hundred feet dependent on the capacity of the supply container, leaving the belt either in the form of finished laminated glass or in the form of layers of foils suitable for consignment and not requiring any kind of finishing treatment.

What I claim as new and desire to secure by Letters Patent is:

1. The method of forming a laminated body composed of at least two plates having a bonding sheet of plastic interposed therebetween, which comprises placing said bonding sheet on one of said plates, then disposing the other plate over the bonding sheet, interposing between the said other plate and sheet at opposite edges of the sheet spacer members formed of the same plastic as the bonding sheet, and progressively pressing the plates and sheet together from one edge of the body to the opposite edge in a direction paralleling the said edges of the sheet adjacent which the spacer members are placed, the spacer members functioning to maintain the said other plate and sheet spaced apart up to the time of pressing them together.

2. The method of forming a laminated body composed of at least two plates having a bonding sheet of plastic interposed therebetween, which comprises placing said bonding sheet on one of said plates, then disposing the other plate over the bonding sheet, interposing between the said other plate and sheet at opposite edges of the sheet spacer members formed of plastic having the same characteristics as the bonding sheet, and progressively pressing the plates and sheet together from one edge of the body to the opposite edge in a direction paralleling the said edges of the sheet adjacent which the spacer members are placed, the spacer members functioning to maintain the said other plate and sheet spaced apart up to the time of pressing them together, the said spacer members being in the form of wedges having their sharp edges directed inwardly between the plate and the sheet whereby such wedges may shift outwardly from between the plate and sheet as the pressure thereon reaches its maximum.

3. The method of forming a laminated body composed of at least two plates having a bonding sheet of plastic interposed therebetween, which comprises placing said bonding sheet on one of said plates, then disposing the other plate over the bonding sheet, and progressively applying pressure to the plates and sheet from one edge of the body to the other to force the plates and sheet together and yieldingly maintaining the said other plate spaced from the sheet up to the time that such pressure forces the plate and sheet together by interpositioning spacers of plastic having the same characteristics as the bonding plastic between the bonding sheet and the said other plate to thereby effect the bringing of the same together at an angle.

4. The method of forming a laminated body composed of at least two plates having a sheet of plastic bonding material interposed therebetween, which comprises placing said bonding sheet on one of said plates, then disposing the other plate over the bonding sheet, interposing spacer members between the said other plate and the bonding sheet at opposite edges of the latter which are formed of the same material as the bonding sheet, and progressively pressing said sheets together from one end edge of the body to the other in a direction paralleling the said opposite edges.

5. The method of forming a laminated body composed of at least two plates having a bonding sheet of plastic therebetween, which comprises conducting the sheet from an extruding nozzle to the surface of one plate along a curved path leading to the plate whereby the sheet is laid down on the plate at an acute angle thereto to expel interposed air, pressing the sheet to the plate as it is laid down thereon and at an angle thereto, applying to the sheet at opposite edges of the same spacer members formed of the same material and having the same characteristics as the bonding sheet, placing the other plate over the sheet and on said members by which it is held spaced from the sheet, and finally pressing the plates and sheet together from one end edge of the body to the other in a direction paralleling said member engaging edges, said members acting to cause the other plate and sheet to assume an angular relation just before the said other plate and the sheet are made to contact by such pressing.

ADOLF KÄMPFER.